Sept. 30, 1952 R. M. M. OBERMAN 2,612,564
COMBINED LINE FINDER FINAL SELECTOR CIRCUIT
Filed July 30, 1947
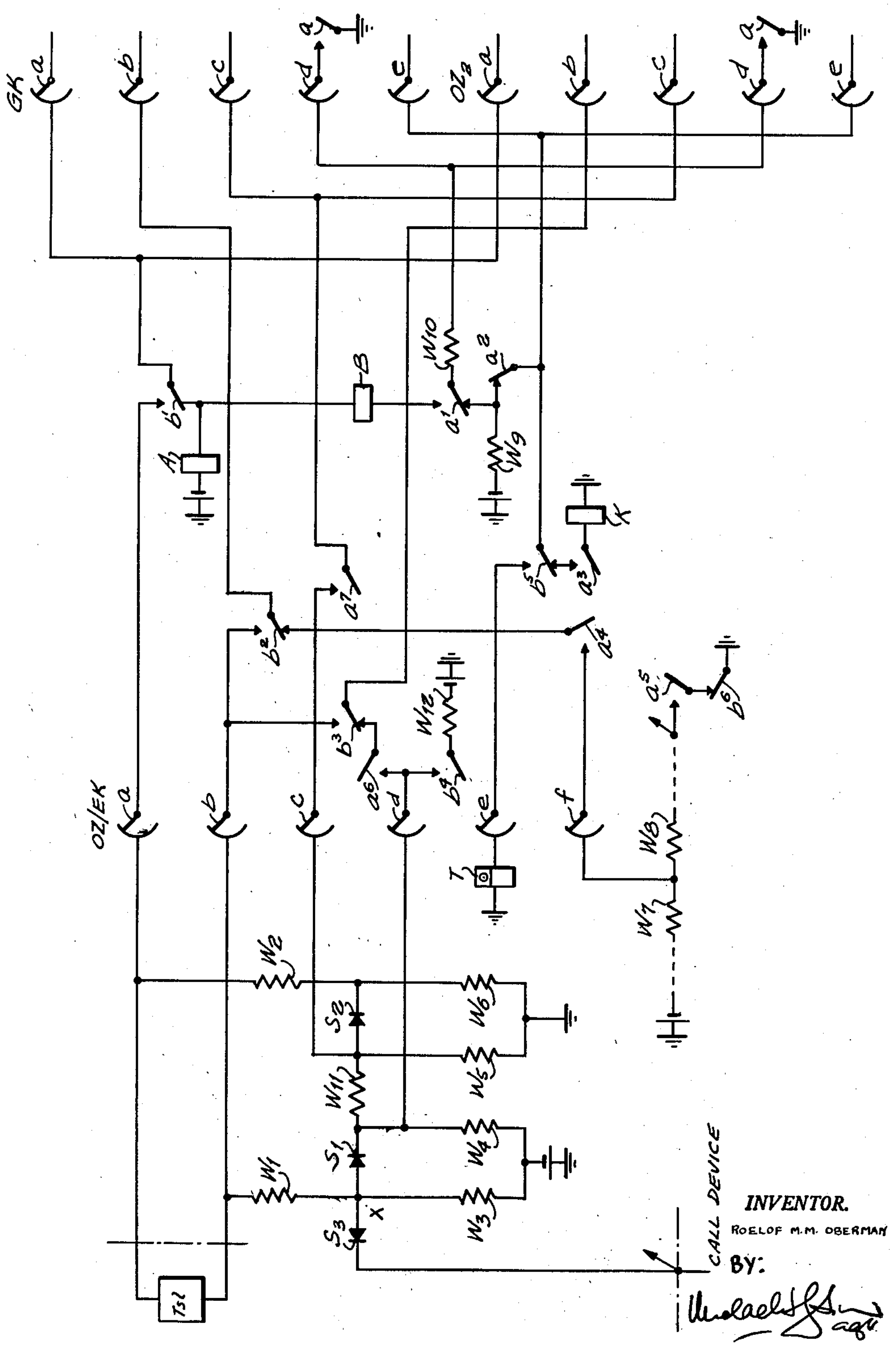
INVENTOR.
ROELOF M.M. OBERMAN
BY:

Patented Sept. 30, 1952 2,612,564

UNITED STATES PATENT OFFICE 2,612,564

COMBINED LINE FINDER FINAL SELECTOR CIRCUIT

Roelof M. M. Oberman, The Hague, Netherlands

Application July 30, 1947, Serial No. 767,526
In the Netherlands June 5, 1946

Section 1, Public Law 690, August 8, 1946
Patent expires June 5, 1966

4 Claims. (Cl. 179—18)

The invention refers to a circuit which in an automatic signalling system in particular a telegraph- or telephone system may perform the function of call finder and of final selector.

A system of this nature is e. g. known from the so-called crossbar system, in which the apparatus belonging to a subscriber individually consists only of a line relay and of a vertical section of a so-called crossbar switch carrying incoming as well as outgoing traffic, a second switching frame making the division between incoming and outgoing traffic, the entire stage being controlled by auxiliary apparatus common to a number of frames if the finding of a call is concerned, whereas a connection to a called subscriber may be established on these frames by a register together with another auxiliary marking device, common to these frames.

The combination of a call finder and a final selector is also known from a system for small terminal exchanges with one selecting stage, which has rotating switches and is positioned for both functions by means of a complicated control circuit in the exchange directly coupled to this stage. The combined call finder/final selector circuit contains a relatively great number of relays serving only one of the two functions. The combination of call finder and final selector in large exchanges according to this system leads to circuits which are too complicated from an economic standpoint.

The system of the invention provides a combined call finder and final selector circuit which entirely avoids the above difficulties of common control apparatus for this stage in the exchange concerned, whereas the relays (one or two) present in the combined circuit all serve one purpose as well as the other, such that only the control wire for specifically marking the circuit as call finder or as final selector is different. The combined call finder/final selector circuit which is entirely controlled by the register regardless of the selecting or finding stages between the register and the combined circuit may be used to advantage in considerable exchanges as well as in small terminal exchanges due to its simplicity.

The system of the invention is obtained by combining a normal finder selector stage and a call finder stage such that the wiper of the combined call finder/final selector essaying the marking for the final selector position, is only connected to a position of the preceding group selector, the wiper essaying the marking for positioning the switch as call finder being only connected to a position of the following call finder, the remaining switching means all serving in the position of the switch both when it functions as call finder and as final selector.

The circuit shown in the accompanying drawing is very apt for use in combination with a combined finder/final selector circuit according to the invention, as the combined circuit requires four through conductors between the separate call finders and final selectors each equipped with five wipers.

The combination of call finder and final selector in a single switch having the properties of both separate circuits thus necessitates six wipers as shown.

If the subscriber lifts his receiver from the hook of the set Tsl for making a call a circuit is closed from —battery, resistance W3 and W4 in series with cell S1, resistance W1, subscriber's line, resistance W2, resistance W6 with parallel cell S2 with resistance W5 to ground. The voltage of point X, which was equal to —battery in the condition of rest of the subscriber line changes to a lower negative voltage depending on the values of said resistances. The shift actuates a call detector (not shown), which may in the case of a small terminal exchange be situated in the preceding main exchange. In a manner not shown in the figure a free register is hereby started which finds the call by first seizing by means of a cord finder a free connecting circuit. The second call finder coupled to the connecting circuit, is then positioned. In the example this is done by means of the equilibrium of D. C. Wheatstone bridges.

Any other positioning method in which a register positions a stage by means of either a D. C. or an A. C. marking, is applicable to the invention.

In principle the adjustment of the second call finder is done as follows. The call detector, which may be assigned e. g. to 100 subscribers, supplies information to the seized register in the value of a D. C. voltage indicating the hundred group in which the call is made. This D. C. voltage should correspond to that determined by potentiometer W9/W10 from the combined call finder/final selector circuit. The *e*-wiper of the second call finder is the control wiper used to test for the voltage required.

If it has been found a free call finder/final selector circuit has been designated, having access to the subscriber hundred group in which the call was made. After the second call finder circuit has been switched through the first call finder, at the same time selector circuit, is positioned by the register. The circuit is prepared for positioning by grounding the register *a*-wire. This causes relay A in this circuit to attract its armature, whereby at contact *a1* a holding circuit is prepared to the contact *a*, which is connected to the second call finder *d*-wiper. The non-operative side of contact *a1* also interrupts the control potentiometer W9/W10 circuit. Contact *a2* interrupts the control wiper circuit which was grounded in the register for busying purposes via a low resistance control relay winding. This control or supervisory relay demagnetises, consequent upon which the zero switch is again connected to the *b*-wire, now leading to the *d*-wiper of the combined call finder/final selector. The *e*-wire is connected in the register to —battery, thus energising driving magnet K of OZ/EK. The selector moves till the zero switch finds a voltage on wiping an outlet which differs from —battery signifying a call. The call finder/final selector circuit is then switched through by removing ground from the register *a*-wire so that relay B may operate in series with relay A. Relay B contacts connect the necessary wires to the register. Before doing this it is possible to determine the nature of the calling subscriber in the register by evaluating resistance W4. The calling condition of the line circuit is neutralised in switching through the call finder/final selector circuit by applying —battery to X via contact *b4* and small resistance W12.

It is observed that resistance W11 is high e. g. $5.10^6$ ohms. The only purpose of this resistance is to provide a slight load on the cells in the blocking direction as the cells S1 and S2 which seldom function will not have a sufficient blocking resistance within sufficiently short time under certain conditions.

A connection to a subscriber connected to a combined call finder/line selector is made via a group selector. The control marking potentiometer (W9/W10) is the same for the positioning of the group selector as for positioning the second call finder. The contacts of all group selector rows and of the second call finder rows except the two *b*-rows are interconnected.

After the positioning of the group selector the control wire is connected via the *b*-wiper of this selector to the *f*-wiper of the combined call finder/line selector this wiper first wiping in known manner a series of potentials, by which the final selector contacts are characterized for an adjustment corresponding to the tens digit of the subscribed selector, while subsequently this wiper wipes a second series of potentials for positioning according to the last digit. Both positionings may be effected in the example by means of D. C. Wheatstone bridge equilibria. The *f*-wiper wipes in finding these positions a number of voltages, e. g. from battery by means of a twenty resistances potentiometer, furnishing the 19 required voltages for final selector column. The figure shows only two resistances (W7, W8) of this potentiometer. It is also possible to provide the selector outlets individually with a potentiometer, while final selector positioning may also be done by means of an A. C. marking.

After positioning the final selector by the tens and by the last digit the register carries out the busy test of the called subscriber on the *c*-wire. If the subscriber is free this is marked by ground on the *c*-contact, if the line is busy the *c*-contact carries negative voltage from the moment in which the called subscriber has lifted his receiver. After the busy test the register may determine the nature of the called subscriber by determining resistance W5 as in Netherlands Patent applicatoin 120,969.

The combined call finder/final selector circuit is switched through by removing ground from the register *a*-wire, whereby the B relay operates in series with the A relay. Both relays are held via the *d*-wiper of the group selector and closed contact *a* in the group selector circuit.

Contact *b4* connects —battery to point X in the line circuit, whereby the subscriber line is made symmetrical. Lifting the receiver on an incoming call now does not actuate the call detector.

The call finder/final selector circuit of the figure may also be used in a small terminal exchange. Per circuit three wire pairs are then required for connection to the main exchange, all possible facilities being retained. The 20 resistance potentiometers, of which resistances W7 and W8 are shown should be fed, by means of a wire pair occurring only once per terminal exchange, from the main exchange. The wire to the call detector should also be prolonged to the main exchange. In this manner it is possible to assimilate small terminal exchanges in a main exchange system, no registers or tube circuits being required in these exchanges, whereby they are reduced to extreme simplicity.

It is also observed that the circuit is such that the connecting circuit always has access to the register meter of the subscriber either called or calling. For local calls it is easily possible to transfer the metering impulse from the calling to the called subscriber.

While I have illustrated and described what I regard to be the preferred embodiment of my invention, nevertheless it will be understood that such is merely exemplary and that numerous modifications and rearrangements may be made therein without departing from the essence of the invention, I claim:

1. An automatic transmission system having selecting and finding switches, comprising in combination, a group selector including a plurality of banks each having a plurality of contacts; a second line finder including a plurality of banks each having a plurality of contacts, said contacts of each bank except one of said group selector being interconnected, respectively, with said contacts of each bank except one of said second line finder, one of said interconnected contact banks being grounded when a call is made; a switch adapted to act in any of the capacities as a first line finder and as a final selector and including a plurality of banks of contacts and wipers engaging said banks, respectively; a first relay connected to said one of said interconnected contacts in one of said banks of said group selector and said second line finder so as to be energized upon the grounding thereof, said first relay having an armature connecting one of said wipers of said switch to the contacts of said bank of said group selector which are not interconnected with any contact of said banks of said second line finder, and another armature connecting another one of said wipers of said switch to the contacts of said bank of said second line finder which are not interconnected with any contact of said banks of said group selector; a second relay connected in series to said first relay and operated upon removing the ground from said one of the interconnected contacts of said one of said banks of said group selector and said second line finder; and a plurality of armatures actuated by said second relay and connecting, respectively, at least a further one of said wipers of said switch to the contacts of at least one of said contact banks of said group selector which are interconnected, respectively, with said contacts of said banks of said second line finder, whereby in the event of a call being made, said interconnected contacts in said one of said banks of said group selector and said second line finder are grounded and said first relay is energized thereby actuating said armatures thereof and connecting said other one of said wipers of said switch to the contacts of said banks of said second line finder which are not interconnected with any contacts of said group selector, and said one wiper of said switch to the contacts of said group selector which are not interconnected with any contacts of said second line finder, and then the ground is removed from said one of the interconnected contacts of said group selector and said second line finder so that said second relay operates and actuates said armatures thereof connecting at least said further one of said wipers of said switch to the contacts of at least one of said contact banks of said second line finder interconnected with the contacts of a bank of said group selector.

2. An automatic transmission system having selecting and finding switches positioned under control of a voltage discriminator arranged in a register and comparing marking potentials with control potentials, comprising in combination, a group selector including a plurality of banks each having a plurality of contacts; a second line finder including a plurality of banks each having a plurality of contacts, said contacts of each bank except one of said group selector being interconnected, respectively, with said contacts of each bank except one of said second line finder, one of said interconnected contact banks being grounded when a call is made; a switch adapted to act in any of the capacities as a first line finder and as a final selector and including a plurality of banks of contacts and wipers engaging said banks, respectively; means for imparting a control potential to one of said contact banks of said switch; a first relay connected to said one of said interconnected contacts in one of said banks of said group selector and said second line finder so as to be energized upon a grounding thereof, said first relay having an armature connecting said wiper engaging said contact bank of said switch to which is imparted the control potential to the contacts of said bank of said group selector which are not interconnected with any contact of said banks of said second line finder, and another armature connecting another one of said wipers of said switch to the contacts of said bank of said second line finder which are not interconnected with any contact of said banks of said group selector; a second relay connected in series to said first relay and operated upon removing the ground from said one of the interconnected contacts of said one of said banks of said group selector and said second line finder; and a plurality of armatures actuated by said second relay and connecting, respectively, at least a further one of said wipers of said switch to the contacts of at least one of said contact banks of said group selector which are interconnected, respectively, with said contacts of said banks of said second line finder, whereby in the event of a call being made, said interconnected contacts in said one of said banks of said group selector and said second line finder are grounded and said first relay is energized thereby actuating said armatures thereof and connecting said other one of said wipers of said switch to the contacts of said banks of said second line finder which are not interconnected with any contacts of said group selector, and said one wiper of said switch to the contacts of said group selector which are not interconnected with any contacts of said second line finder, and then the ground is removed from said one of the interconnected contacts of said group selector and said second line finder so that said second relay operates and actuates said armatures thereof connecting at least said further one of said wipers of said switch to the contacts of at least one of said contact banks of said second line finder interconnected with the contacts of a bank of said group selector.

3. An automatic transmission system having selecting and finding switches positioned under control of a voltage discriminator arranged in a register and comparing marking potentials with control potentials, comprising in combination, a line circuit including points each having different potentials when said line circuit is free and engaged, respectively; a group selector including a plurality of banks each having a plurality of contacts; a second line finder including a plurality of banks each having a plurality of contacts, said contacts of each bank except one of said group selector being interconnected, respectively, with said contacts of each bank except one of said second line finder, one of said interconnected contact banks being grounded when a call is made; a switch adapted to act in any of the capacities as a first line finder and as a final selector and including a plurality of banks of contacts and wipers engaging said banks, respectively; means for imparting a control potential to one of said contact banks of said switch; a first relay connected to said one of said interconnected contacts in one of said banks of said group selector and said second line finder so as to be energized upon a grounding thereof, said first relay having an armature connecting said wiper engaging said contact bank of said switch which is imparted the control potential to the contacts of said bank of said group selector which are not interconnected with any contact of said banks of said second line finder, and another armature connecting another one of said wipers of said switch to the contacts of said bank of said second line finder which are not interconnected with any contact of said banks of said group selector; means for connecting said contact bank of said switch being in engagement with a third one of said wipers of said switch to one of the points of said line circuit having different potentials when said line circuit is free and engaged, respectively; a second relay connected in series to said first relay and operated upon removing the ground from said one of the interconnected contacts of said one of said banks of said group selector and said second line finder; and a plurality of armatures actuated by said second relay and connecting, respectively, at least one of said wipers of said switch to the contacts of at least one of said contact banks of said group selector which are interconnected, respectively, with said contacts of said banks of said second line finder, whereby in the event of a call being made, said interconnected contacts in said one of said banks of said group selector and said second line finder are grounded and said first relay is energized thereby actuating said armatures thereof and connecting said other one of said wipers of said switch to the contacts of said banks of said second line finder which are not interconnected with any contacts of said group selector, and said one wiper of said switch to the contacts of said group selector which are not interconnected with any contacts of said second line finder, then the ground is removed from said one of the interconnected contacts of said group selector and said second line finder so that said second relay operates and actuates said armatures thereof connecting at least said further one of said wipers of said switch to the contacts of at least one of said contact banks of said second line finder interconnected with the contacts of a bank of said group selector, and a busy test is allowed to be carried out over said contact bank of said switch which is connected to one of the points of said line circuit having different potentials when said line circuit is free and engaged, respectively.

4. An automatic transmission system in which a voltage discrimination device in a register compares control voltages with marking voltages comprising in combination, a group selector having a first contact bank, a second contact bank, a third contact bank, a fourth contact bank, a fifth contact bank, a first wiper, a second wiper, a third wiper, a fourth wiper and a fifth wiper engaging, respectively, said first contact bank, said second contact bank, said third contact bank, said fourth contact bank, and said fifth contact bank of said group selector; a second line finder having a first contact bank, a second contact bank, a third contact bank, a fourth contact bank, a fifth contact bank, a first wiper, a second wiper, a third wiper, a fourth wiper and a fifth wiper engaging, respectively, said first contact bank, said second contact bank, said third contact bank, said fourth contact bank, and said fifth contact bank of said second line finder, the contacts of said first, third, fourth and fifth contact banks of said group selector and said second line finder being interconnected, respectively, in pairs; a combined final selector and first line finder switch including a first contact bank, a first wiper engaging the same, a second contact bank, a second wiper engaging the same, a third contact bank, a third wiper engaging the same, a fourth contact bank, a fourth wiper engaging the same, a fifth contact bank, a fifth wiper engaging the same, a sixth contact bank, and a sixth wiper engaging the same; a first relay being connected to said interconnected first contact banks of said group selector and said second line finder so as to be energized when any of said first wipers of said group selector and said second line finder is grounded said first relay having a first armature, a second armature, a third armature, a fourth armature, a fifth armature, a sixth armature and a seventh armature; a potentiometer having two resistors connected to each other by said first armature of said first relay when the same is deenergized, one of said resistors being connected to said interconnected fourth contact banks of said group selector and said second line finder, said second armature of said first relay connecting said other of said resistors to said interconnected fifth contact banks of said group selector and said second line finder and interrupting the connection with said interconnected fifth contact banks upon energization of said first relay; a stepping magnet for said combined final selector and first line finder switch, said magnet being connected upon energization of said first relay by said third armature thereof to said interconnected fifth contact banks of said group selector and second line finder, said fourth armature of said first relay establishing upon energization of the same a connection between said sixth wiper of said combined final selector and first line finder switch to said second contact bank of said group selector; means for imparting a control potential to said sixth contact bank of said combined final selector and first line finder switch and including said fifth armature of said first relay, said fifth armature rendering said imparting means operative upon energization of said first relay; a line circuit connected to said first and second contact banks of said combined final selector and first line finder switch and including a plurality of points having each different potentials when said line circuit is free and engaged, respectively, one of said points being connected to the third contact bank of said combined final selector and first line finder switch and serving for the busy test when said line circuit is called by an incoming call, another one of said points being connected to the fourth contact bank of said combined final selector and first line finder switch, the sixth armature of said first relay establishing upon energization thereof a connection between said fourth wiper of said combined final selector and first line finder switch and said second contact bank of said second line finder to which the voltage discriminating device has been connected, said seventh armature of said first relay establishing upon energization thereof a connection between said third wiper of said combined final selector and first line finder switch and said interconnected third contact banks of said group selector and second line finder so as to enable the busy test to be carried out over said third contact bank of said combined final selector and first line finder switch connected to said one point of said line circuit; and a second relay connected in series to said first relay and said first armature thereof, said second relay being short-circuited by a ground applied by the register to the interconnected first wipers of said group selector and said second line finder and being energized upon removal of ground therefrom, said second relay having a first armature, a second armature, a third armature, a fourth armature, a fifth armature and a sixth armature, said first armature of said second relay upon energization thereof disconnecting the junction of said first relay and said second relay from said interconnected first contact banks of said group selector and said second line finder and connecting the same to said first wiper of said combined final selector and first line finder switch, said second armature of said second relay upon energization thereof disconnecting said sixth wiper of said combined final selector and first line finder switch from said second contact bank of said group selector and connecting the same to said second wiper of said combined final selector and first line finder switch, said third armature of said second relay upon energization thereof disconnecting the fourth wiper and connecting said second wiper of said combined final selector and first line finder switch to said second contact bank of said second line finder, said fourth armature of said second relay restoring the potential of a third one of said points of said line finder circuit connected to said fourth contact bank of said combined final selector and first line finder switch upon energization of said second relay, said fifth armature of said second relay connecting said fifth wiper of said combined final selector and first line finder switch to said interconnected fifth contact banks of said group selector and second line finder so as to enable the call to be counted, said sixth armature of said second relay being connected in series with said control potential imparting means and rendering the same inoperative upon energization of said second relay, whereby said second wiper of said combined final selector and first line finder switch is connected by means of said second armature of said second relay to the second contact bank of said group selector and by said third armature of said second relay to said second contact bank of said second line finder.

ROELOF M. M. OBERMAN.

REFERENCES CITED

The following references are of record in the file of this patent:

UNITED STATES PATENTS

| Number | Name | Date |
|---|---|---|
| 1,361,980 | Goodrum | Dec. 14, 1920 |
| 1,951,134 | Dixon | Mar. 13, 1934 |